March 20, 1962  E. JONES  3,025,931
MOUNTINGS FOR SPINDLES, RODS, SHAFTS AND THE LIKE
Filed May 6, 1959
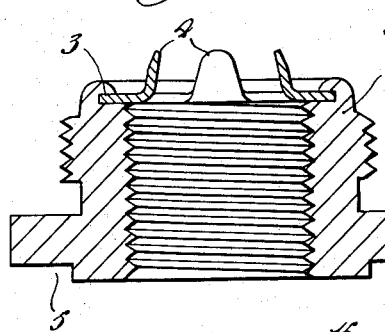
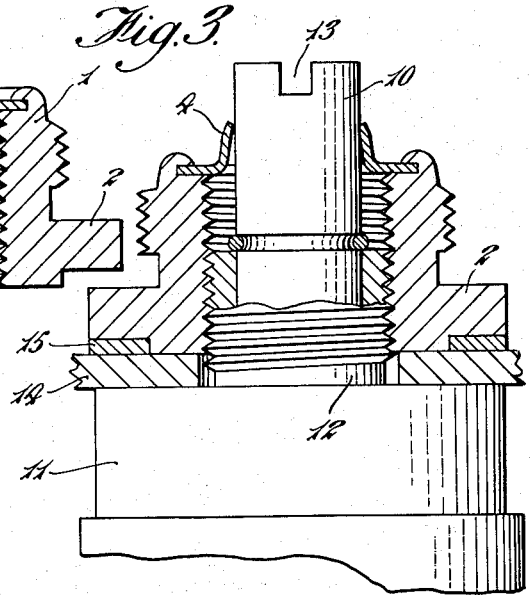
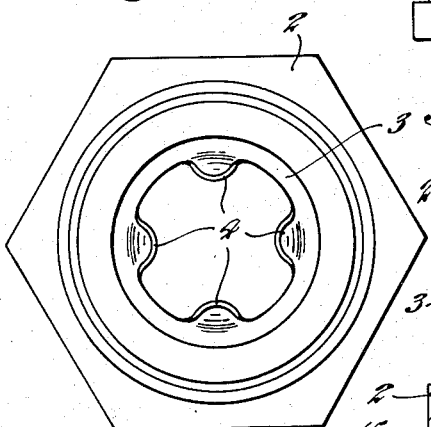
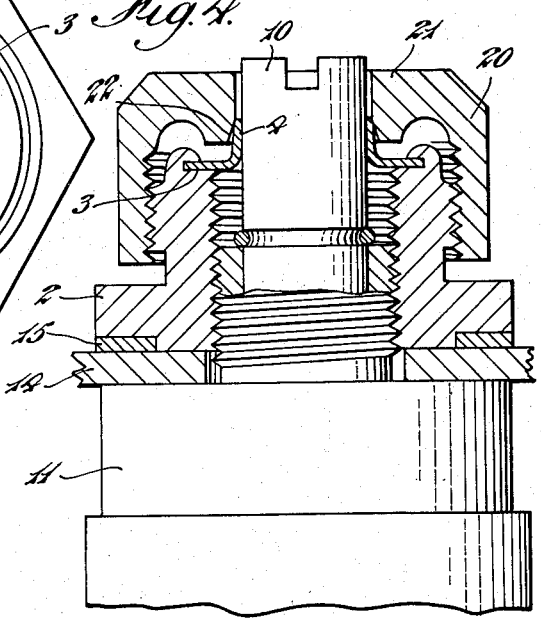
INVENTOR
Ernest Jones
By Watson, Cole, Grindle & Watson
ATTORNEYS

United States Patent Office 3,025,931
Patented Mar. 20, 1962

3,025,931
MOUNTINGS FOR SPINDLES, RODS, SHAFTS
AND THE LIKE
Ernest Jones, Trethomas, near Newport, Wales, assignor to Simmonds Aerocessories Limited, a British company
Filed May 6, 1959, Ser. No. 811,368
Claims priority, application Great Britain May 7, 1958
1 Claim. (Cl. 188—83)

This invention relates to mountings for spindles, rods, shafts and the like, all of which are hereinafter referred to as a spindle.

There are many instances where it is necessary to rotate a spindle, e.g. the control spindle of a variable condenser, potentiometer or other radio component, in order to vary the position of a part carried by the spindle and, after the part has been moved to its adjusted position, it is desirable that the spindle should be firmly held in its adjusted position and unaffected by vibration, shocks and the like but capable of being moved when desired to re-adjust the part by the application of a pronounced torque to the spindle, and it is the principal object of this invention to provide an improved mount for a spindle enabling the spindle to be held effectively against unwanted rotation yet permitting desired rotation.

With the above object in view we provide in accordance with our invention a mount comprising a sleeve which is provided with screw threads whereby it may be screwed to a relatively stationary part and which has secured thereto a resilient sheet metal fastener comprising a base having an opening to receive the spindle and a plurality of resilient tongues projecting from the base about the opening in the same general direction, the free end portions of the tongues extending inwardly of the roots of the tongues so that when the spindle is passed between the tongues they are stressed and exert a pronounced frictional grip on the spindle. Preferably means are provided whereby the grip exerted by the tongues on the spindle may be increased to any desired degree within limits.

One form of mount according to our invention will now be described with reference to the accompanying drawing, in which:

FIGURE 1 is a central vertical sectional view of the mount;

FIGURE 2 is a top plan view of the mount shown in FIGURE 1;

FIGURE 3 is a side elevational view, partly in section, of the mount shown in FIGURES 1 and 2 applied to the control spindle of a variable potentiometer, and FIGURE 4 is a similar view of the assembly shown in FIGURE 3, showing a nut member applied to the mount to clamp the tongues of the sheet metal fastener against the control spindle.

The mount shown in the drawing comprises a sleeve 1 having a generally cylindrical body portion which is internally threaded from one end (hereinafter termed the inner end) almost to the other end. At its inner end the body has an outwardly-extending flange 2 of hexagonal contour and at its outer end the body is counterbored to provide a shallow cylindrical recess in which is housed the centrally apertured circular base 3 of a resilient sheet metal fastener, the base being retained within the recess by a clinched-over portion of the side wall of the recess.

The sheet metal fastener is formed of spring steel and comprises the base from the inner periphery of which project outwardly and in a general axial direction four symmetrically disposed tongues 4 having well-rounded free end portions, as shown in FIGURE 2. The tongues are inclined slightly towards the axis of the fastener and are somewhat convexly rounded and transversely curved, as shown in FIGURES 1 and 2.

The opening defined by the free ends of the tongues 4 has a diameter slightly less than the diameter of the control spindle 10 of the variable potentiometer 11 (FIGURES 3 and 4) and when the body of the mount is screwed on to the externally threaded bearing member 12 for the spindle so that the spindle extends between the tongues, the spindle stresses them. The adjacent end of the spindle may be provided with a screw-driver slot 13 to permit application to the spindle of sufficient torque to overcome the strong resistance to turning of the spindle imposed by the sheet metal fastener. The other end of th spindle carries the rotary member of the potentiometer to be adjusted. The bearing member 12 for the spindle is fixed to a relatively stationary part of the potentiometer and serves to secure the potentiometer to a panel or other support 14, the bearing member extending through a hole in the panel and the body of the mount screwed thereon clamping the potentiometer to the panel or other support. A washer 15, which may also serve to identify a circuit, is located between the panel or other support and the hexagonal flange 2 on the body, the flange having a recess 5 to receive the washer.

Preferably the body of the mount adjacent its outer end is externally threaded to receive a nut member 20 (FIGURE 4) having at its outer end an inwardly-extending annular flange 21 provided with an annular, bevelled portion 22 adapted, when the nut member is screwed on to the body, to engage the outer surfaces of the spring tongues 4 to clamp them against the spindle 10 to increase their frictional grip on the spindle, and it will be understood that the clamping effect of the tongues on the spindle may be adjusted within limits by slackening or tightening the nut member 20.

The mount may be constructed of metal or of a plastics or other suitable material. The tongues of the sheet metal fastener, instead of extending axially outwardly can extend axially inwardly; in the latter case the free ends of the tongues preferably flare outwardly to facilitate the entry of the spindle between the tongues.

Although the present invention is intended more especially to provide an arrangement preventing undesired rotation of a spindle it may also be applied to restrain undesired axial movement of a spindle.

Our invention comprises not only the improved mount but also an assembly comprising a spindle movable relatively to a stationary part, and a mount as set forth above screwed to the stationary part with the spindle extending between the tongues of the fastener of the mount, the tongues gripping the spindle.

I claim:

An assembly comprising a spindle movable relatively to a stationary part and a mount comprising a sleeve secured to the stationary part and surrounding the spindle and a fastener secured to the sleeve, the fastener being made of resilient sheet metal and providing a base by which the fastener is secured to the sleeve, said base having an opening through which the spindle passes and a series of tongues extending from the base about the opening, each tongue being inclined toward the shaft and terminating in a rounded free end portion which is convex with respect to said shaft and which contacts said shaft under resilient pressure, and means whereby the grip exerted by the tongues on the spindle may be increased, said grip increasing means comprising a nut member screwed onto the sleeve and provided with an inwardly extending annular flange having an annular beveled portion, the tongues extending within the annular bevelled portion so as to be engaged thereby.

(References on following page)

References Cited in the file of this patent

UNITED STATES PATENTS

| | | |
|---|---|---|
| 1,344,544 | Lorenz | June 22, 1920 |
| 1,460,513 | Ross | July 3, 1923 |
| 1,562,120 | Nemcovsky | Nov. 17, 1925 |
| 1,588,039 | Monosmith | June 8, 1926 |
| 1,601,976 | Mayer | Oct. 5, 1926 |
| 1,755,829 | Loughead | Apr. 22, 1930 |
| 2,163,134 | Semion | June 20, 1939 |
| 2,214,458 | Glamb | Sept. 10, 1940 |
| 2,474,990 | Slatin | July 5, 1949 |
| 2,587,134 | Flora | Feb. 26, 1952 |
| 2,854,099 | Damon | Sept. 30, 1958 |

FOREIGN PATENTS

| | | |
|---|---|---|
| 761,771 | Great Britain | Nov. 21, 1956 |